(12) United States Patent
Sridhara et al.

(10) Patent No.: US 10,437,674 B1
(45) Date of Patent: Oct. 8, 2019

(54) VARIABLE PARITY SECTORS

(71) Applicant: Seagate Technology LLC, Cupertino, CA (US)

(72) Inventors: Deepak Sridhara, Longmont, CO (US); Ara Patapoutian, Hopkinton, MA (US)

(73) Assignee: Seagate Technology LLC, Cupertino, CA (US)

( * ) Notice: Subject to any disclaimer, the term of this patent is extended or adjusted under 35 U.S.C. 154(b) by 134 days.

(21) Appl. No.: 15/611,733

(22) Filed: Jun. 1, 2017

(51) Int. Cl.
G06F 11/00 (2006.01)
G06F 11/10 (2006.01)
G06F 3/06 (2006.01)

(52) U.S. Cl.
CPC ............ *G06F 11/108* (2013.01); *G06F 3/065* (2013.01); *G06F 3/0619* (2013.01); *G06F 3/0655* (2013.01); *G06F 3/0679* (2013.01); *G06F 11/1064* (2013.01); *G06F 11/1072* (2013.01); *G06F 11/1076* (2013.01); *G06F 11/1068* (2013.01)

(58) Field of Classification Search
CPC .... G06F 11/1076; G06F 11/08; G06F 11/076; G06F 11/0793; G06F 11/1044; G06F 11/1096; G06F 11/108
See application file for complete search history.

(56) References Cited

U.S. PATENT DOCUMENTS

| 5,650,969 | A  | * | 7/1997 | Niijima | G06F 11/108 365/200 |
| 5,799,140 | A  | * | 8/1998 | Niijima | G06F 11/1076 711/100 |
| 8,699,162 | B1 |   | 4/2014 | Grobis |  |
| 8,719,664 | B1 | * | 5/2014 | Chan | G06F 11/1076 711/103 |
| 9,229,813 | B2 |   | 1/2016 | Chatradhi |  |
| 2002/0124137 | A1 |   | 9/2002 | Ulrich |  |
| 2015/0128008 | A1 |   | 5/2015 | Chatradhi |  |
| 2015/0254135 | A1 | * | 9/2015 | Chatradhi | G06F 11/1076 714/764 |
| 2017/0132072 | A1 | * | 5/2017 | Park | G06F 11/1044 |

OTHER PUBLICATIONS

T. M. Cover, "Broadcast Channels", IEEE Transactions on Information Theory, vol. 18, No. 1, pp. 2-14, Jan. 1972, 13 pages.

\* cited by examiner

*Primary Examiner* — Charles Ehne
(74) *Attorney, Agent, or Firm* — Setter Roche LLP; Kirk A. Cesari (57) ABSTRACT

Systems and methods are disclosed for employing variable amounts of parity sectors. In certain embodiments, an apparatus may comprise a processor configured to generate a first number of parity sectors for write data to be written to a nonvolatile memory, and store the write data and a second number of parity sectors to the nonvolatile memory, the second number of parity sectors being a subset less than all of the first number of parity sectors. The processor may further select additional parity sectors from the first number of parity sectors based on error metrics for the write data, store the additional parity sectors to the nonvolatile memory, and perform error recovery on the write data based on the additional parity sectors.

20 Claims, 8 Drawing Sheets

VARIABLE PARITY SECTORS

SUMMARY

In certain embodiments, an apparatus may comprise a processor configured to generate a first number of parity sectors for write data to be written to a nonvolatile memory, and store the write data and a second number of parity sectors to the nonvolatile memory, the second number of parity sectors being a subset less than all of the first number of parity sectors. The processor may further select additional parity sectors from the first number of parity sectors based on error metrics for the write data, store the additional parity sectors to the nonvolatile memory, and perform error recovery on the write data based on the additional parity sectors.

In certain embodiments, a method may comprise generating a first number of parity sectors for write data to be written to a nonvolatile memory, and storing the write data and a second number of parity sectors to the nonvolatile memory, the second number of parity sectors being a subset less than all of the first number of parity sectors. The method may further comprise selecting additional parity sectors from the first number of parity sectors based on error metrics for the write data, storing the additional parity sectors to the nonvolatile memory, and performing error recovery on the write data based on the additional parity sectors.

In certain embodiments, a memory device may store instructions that, when executed, cause a processor to perform a method comprising generating a first number of parity sectors for write data to be written to a nonvolatile memory, and storing the write data and a second number of parity sectors to the nonvolatile memory, the second number of parity sectors being a subset less than all of the first number of parity sectors. The method may further comprise selecting additional parity sectors from the first number of parity sectors based on error metrics for the write data, storing the additional parity sectors to the nonvolatile memory, and performing error recovery on the write data based on the additional parity sectors.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

Figure 1:
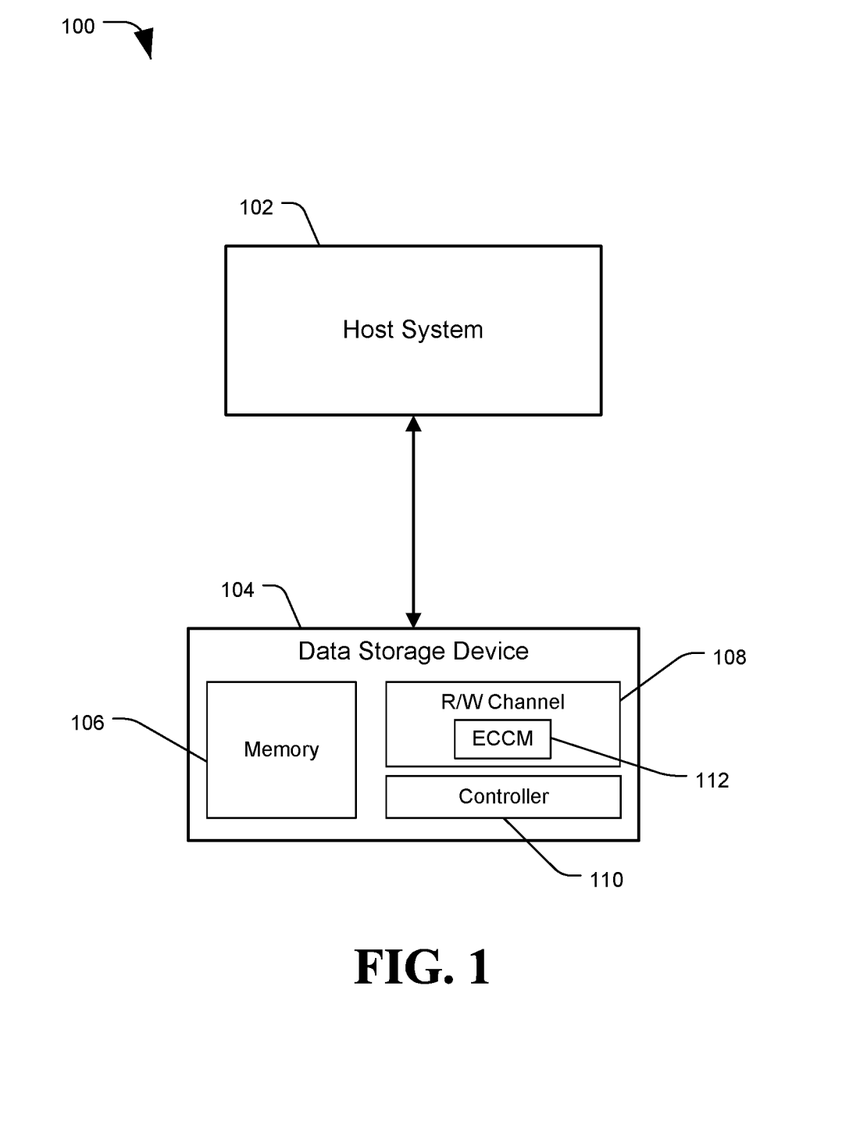
FIG. 1 is a diagram of a system configured to employ variable parity sectors, in accordance with certain embodiments of the present disclosure.

FIG. 1 is a diagram of a system, generally designated 100, configured to employ variable parity sectors, in accordance with certain embodiments of the present disclosure. The system 100 may include a data storage device (DSD) 104, such as a storage drive or any other device which may be used to store or retrieve data, including a hard disc drive (HDD), solid state drive (SSD), or hybrid drive. The DSD 104 may include a memory 106, a read/write (R/W) channel 108, and a controller 110. The memory 106 may comprise one or more data storage mediums, such as magnetic storage media like disc drives, solid state media such as NAND flash memory, other types of memory, or a combination thereof. The R/W channel 108 may comprise one or more circuits or processors configured to process signals for recording to or reading from the memory 106. The controller 110 may be a processor or circuit configured to perform data access operations, such as reads or writes, to the memory 106. Data retrieved from the memory 106, or to be stored to the memory 106, may be processed via the R/W channel 108, such as encoding or decoding signals, detecting values from signal waveforms, or other processing.

The system 100 may optionally include a host device 102, which may also be referred to as the host system or host computer. The host 102 can be a desktop computer, a laptop computer, a workstation, a tablet computer, a telephone, a music player, another electronic device, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive). The host 102 may issue data access requests, such as read or write requests, to the DSD 104. In response, the DSD 104 may perform data access operations on the memory 106 via the R/W channel 108 based on the requests.

The DSD 104 may also include an error correction code module (ECCM) 112, which may be included in the controller 110, the R/W channel 108, or otherwise included in the DSD 106. The ECCM 112 may be configured to recover data that could not be read during a read operation. When data is stored to the memory 106, such as user data, it may be stored with certain error recovery data or error correction code (ECC). ECC may include parity data and other information that can be used by the ECCM 112 to mathematically reconstruct data that was not successfully read from the memory 106. The ECCM 112 may encode data to be written with ECC algorithms, and then decode read data and use the ECC to recover data that was lost due to errors.

For example, data on a memory 106 may include errors, either due to flaws in the physical storage medium, or due to errors that occurred when the data was written. Similarly, errors may occur during a read operation which prevent even error-free written data from being read correctly. If a number of bits of a sector were not successfully read, inner code (IC) stored to individual sectors may be used to recover the bits and obtain the data from the sector. Outer code (OC) parity data may be generated for a group of sectors called an outer code block (OC block), and may be used to recover sectors that are otherwise unrecoverable using inner code. In example embodiments discussed herein, an outer code block may correspond to a full data track of a hard disc, although other embodiments are also possible. Iterative outer code (IOC) may be a process of iterating between inner code recovery and outer code recovery to rebuild and recover data. As discussed herein, performing OC recovery may instead or also include performing IOC recovery. Other types of ECC are also possible, and references herein to OC blocks and OC parity sectors may refer to other types of ECC blocks and ECC parity sectors. Various error correction algorithms may have a limit to how many errors can be corrected, for example based on how many error correction bits are stored per user data bits. This limit may be referred to as an "error correction capability" of the correction scheme or DSD 104. As an example, an OC error correction scheme employed by the DSD 104 may be capable of recovering four sectors of data per track. If more than four sectors on a track are unable to be read, the error correction may fail.

Generally, the ECCM 112 may generate a number of parity sectors, or outer codewords, for each OC block, and store the OC parity sectors with the user data of the OC block. When the entire OC block is read, the successfully read sectors and the OC parity sectors may be used to recover failed sectors from the OC block. As an example, each OC parity sector may enable the recovery of one sector that failed to read from the OC block. Accordingly, outer codes in storage devices significantly improve the reliability of the device.

However, parity sectors consume storage capacity of the device, reducing the capacity available for user data. Most OC parity sectors may never be required, or fewer parity sectors may be required than are written to a track. Some tracks may be less reliable than others. By generating a fixed number of parity sectors for all tracks, the risk is losing data on bad tracks with too few parity sectors, or wasting storage capacity of the device by generating enough parity sectors for all tracks as would be required for the bad tracks.

Accordingly, the ECCM 112 may employ variable length outer codes, resulting in a variable number of parity sectors per OC block. The number of parity sectors retained for each OC block may correspond to the quality or reliability of the data for that OC block. This may be particularly applicable in environments where data is unlikely to change often once written, such as for shingled magnetic recording (SMR) hard drives or NAND flash solid state memory. Using a variable amount of parity sectors, generated in a memory and processor-efficient manner, can greatly improve the performance of computer storage devices. An example embodiment of system 100, including a more detailed diagram of DSD 104, is depicted in FIG. 2.

Figure 2:
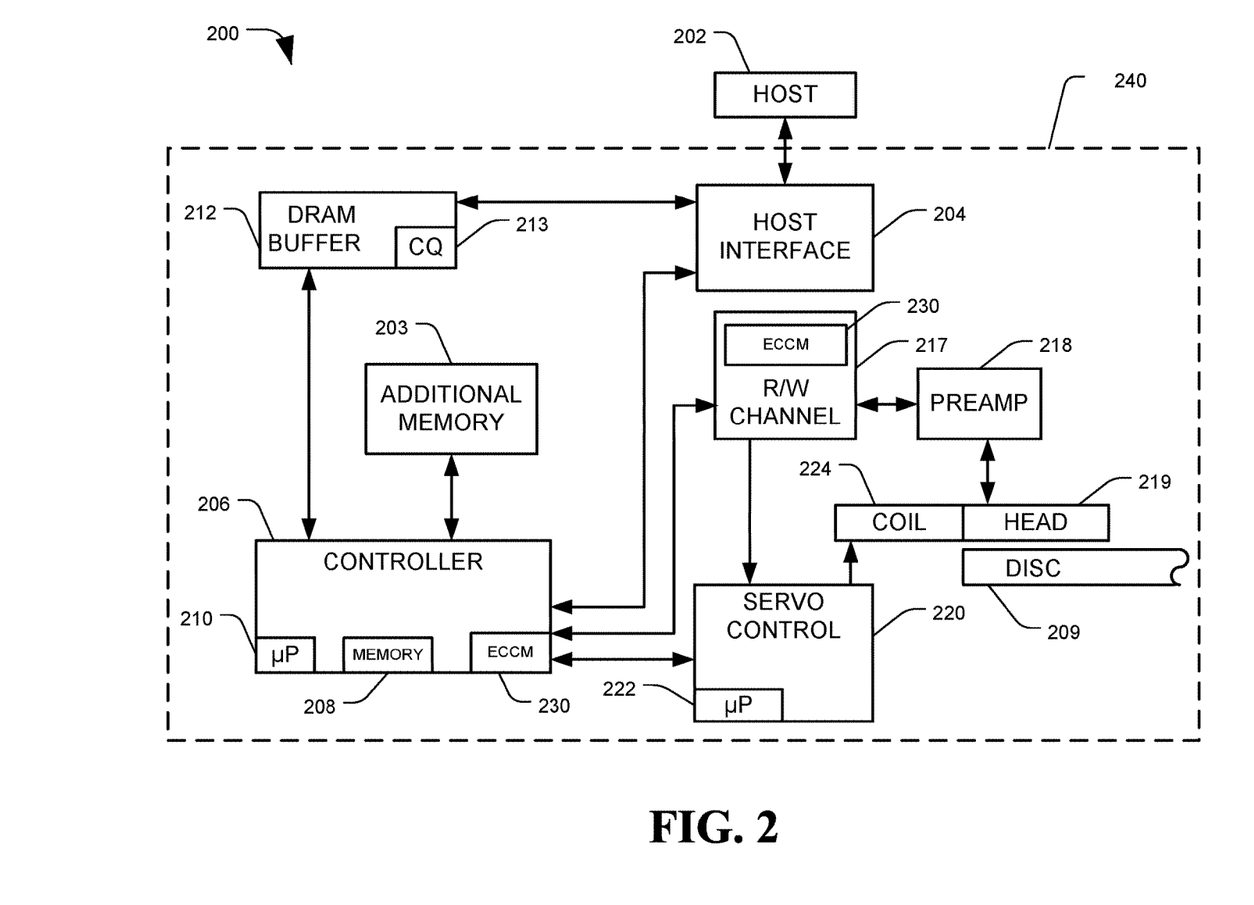
FIG. 2 is a diagram of a system configured to employ variable parity sectors, in accordance with certain embodiments of the present disclosure.

FIG. 2 is a diagram of a system, generally designated 200, configured to employ variable parity sectors, in accordance with certain embodiments of the present disclosure. Specifically, FIG. 2 provides a functional block diagram of an example data storage device (DSD) 200. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. The DSD 200 may have a casing 240 housing the components of the DSD 200. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller 206 may control data access operations, such as reads and writes, to one or more disc memories 209. The DSD 200 may include an additional memory 203 instead of or in addition to disc memory 209. For example, additional memory 203 can be a solid state memory, which can be either volatile memory such as DRAM or SRAM, non-volatile memory such as NAND Flash memory, or a combination thereof. The additional memory 203 can function as a working memory for storing generated parity sectors, a cache to store recently or frequently read or written data, or data likely to be read soon, or for other temporary data storage. Additional memory 203 may also function as main long-term storage instead of or in addition to disc(s) 209. A DSD 200 containing multiple types of nonvolatile storage mediums, such as a disc(s) 209 and flash 203, may be referred to as a hybrid storage device.

The DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. In some embodiments, the preamp 218 and head(s) 219 may be considered part of the R/W channel 217. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. A similar R/W channel may be employed for data storage and retrieval from a solid state memory, such as a flash additional memory 203.

DSD 200 may include an error correction code module (ECCM) 230. The ECCM 230 may perform the methods and processes described herein to generate parity sectors for an OC block, and then determine a number of the generated parity sectors to store to nonvolatile memory. The ECCM 230 may generate a set number "R" (large R) of parity sectors for all OC blocks, and write a subset "r" (small r) of the R parity sectors with the user data of the OC block. The remaining parity sectors, R−r ("R minus r"), may be retained in a memory such as DRAM 212 or additional memory 203 after the rest of the OC block and r parity sectors are written to nonvolatile memory, such as disc 209. For example, the ECCM 230 may generate ten (R) parity sectors for each OC block, and store four (r) of them along with user data of the OC block to nonvolatile memory. The remaining six (R−r) parity sectors may be retained in temporary memory.

The ECCM 230 may then evaluate error metrics for the OC block to determine whether to retain any of the remaining R−r parity sectors as additional parity sectors, and if so, how many to retain (e.g. from 0 to R−r additional parity sectors). An OC block that has many errors may result in retaining the full R−r additional parity sectors for that OC block. Blocks with fewer errors may result in retaining fewer parity sectors, or even 0 additional parity sectors. Once the ECCM 230 determines how many additional parity sectors to retain for the OC block, those additional parity sectors may be written to a nonvolatile memory. For example, the additional parity sectors may be written to a different region of the media from the rest of the OC block, such as a spare or media cache zone of the disc 209 memory, NAND Flash memory 203, or some other non-volatile region of the system. A media cache may be a zone or region of nonvolatile memory designated for temporarily storing user data or storing other non-user data. For example, a disc may have zones configured to be written using shingled magnetic recording (SMR), and one or more zones designated as a media cache intended for sequential storage of data in a non-shingled track manner. When the additional parity sectors are stored to nonvolatile memory, the ECCM 230 may update a mapping table to associate the OC block and the additional parity sectors, so that the DSD 200 may locate and retrieve the additional parity sectors if needed to correct read errors. The ECCM 230 may discard any additional parity sectors not retained.

When reads are performed, the ECCM 230 may determine whether errors were encountered, and if so, whether they can be corrected with the r parity sectors stored with the OC block, or whether the additional parity sectors should also be read. For example, if r equals four parity sectors, the ECCM 230 may be able to recover up to four failed sector reads from the OC block using erasure correction. In some embodiments, the ECCM 230 may be able to recover more than r failed sectors using IOC recovery, and therefore the threshold number of errors to trigger retrieving the additional parity sectors may depend on the error correction capabilities of the ECC algorithms and capabilities of the DSD 200. If more sectors failed than the error correction capabilities of the system can correct with r parity sectors, the ECCM 230 may retrieve the additional parity sectors.

The ECCM 230 may be a processor, controller, or other circuit, or it may be a set of software instructions that, when executed by a processing device, perform the functions of the ECCM 230. In some embodiments, the ECCM 230 may be part of or executed by R/W channel 217, part of or executed by the controller 206, included in or performed by other components of the DSD 200, a stand-alone component, or any combination thereof. Example implementations of generating variable parity sectors are discussed in regard to FIG. 3.

Figure 3:
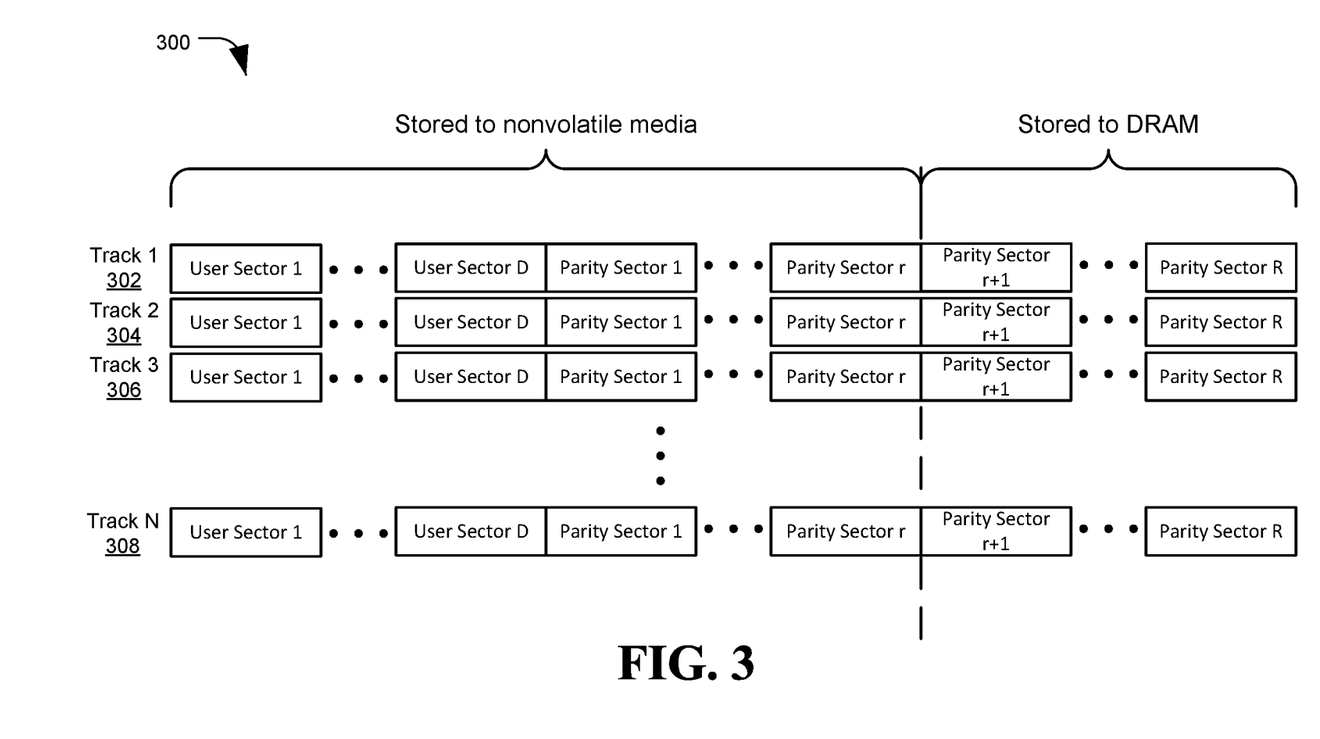
FIG. 3 is a diagram of a system configured to employ variable parity sectors, in accordance with certain embodiments of the present disclosure.

FIG. 3 is a diagram of a system, generally designated 300, configured to employ variable parity sectors, in accordance with certain embodiments of the present disclosure. In particular, system 300 includes an example set of tracks, including track 1 302, track 2 304, track 3 306, up to track N 308. Each track may be an OC block and include a number of user sectors and parity sectors (e.g. outer code parity sectors). As discussed herein, the outer codes may be formed across the sectors in an OC block; in the depicted example, an OC block may comprise a single track. More generally, however, the outer codes can be formed across different configurations of OC blocks, such as sectors in multiple tracks, in a band, in a zone, or other disjoint regions in the media.

During or prior to the time of writing sectors in an OC block to a nonvolatile media, an ECCM may compute a selected maximum number R of outer code parity sectors. However, during the end of the track write, the ECCM may only write a smaller number r of these parity sectors to the track. The remaining R−r parity sectors (parity sector r+1 to parity sector R) are stored in another memory, such as DRAM. For example, all R parity sectors for track 1 302 may be generated in a volatile memory such as RAM when the user sectors for track 1 are received and encoded for writing. The D user sectors and r parity sectors may be written to track 1 302, and the R−r additional or remaining parity sectors may be transferred to another memory such as DRAM while a write head switches tracks to begin writing the next track 2 304. In this manner, every track may have a minimum number r of parity sectors, regardless of any error metrics or write quality for the track. In other embodiments, there may be no minimum number of parity sectors (e.g. r=0), and all parity sectors may be in the "additional" parity sector group of r+1 to R.

The ECCM may then evaluate one or more quality or error metrics for the written track, which metrics may indicate how well the data was written, or a likelihood of encountering read errors. Various types of error metrics may be used. For example, a read of the track may be performed to determine a number of sectors that failed to read. Other quality metrics may come from the servo system or the read/write channel. For example, a servo quality metric may include a position error signal (PES) of a write head when writing the current track, adjacent tracks, or both. When a write head strays significantly from a center line of a track during a write operation, it may make the written data harder to read, providing error metrics for the current track. Further, the signal from the straying write head may corrupt data on one or more adjacent tracks, providing error metrics for the adjacent tracks. An example may be in shingled magnetic recording where data is written in bands of tracks, with each track partially overwriting one or more previous tracks. If the PES from the servo indicates that the write of the current track encroached on a previous track, this can provide error metrics for the previous track. Error metrics from a channel may include low LLR (log likelihood ratio) count in the SOVA (soft output Viterbi algorithm) to LDPC (low density parity check) transfer, mean squared error metrics in the channel equalizer, or other quality metrics.

Figure 4:
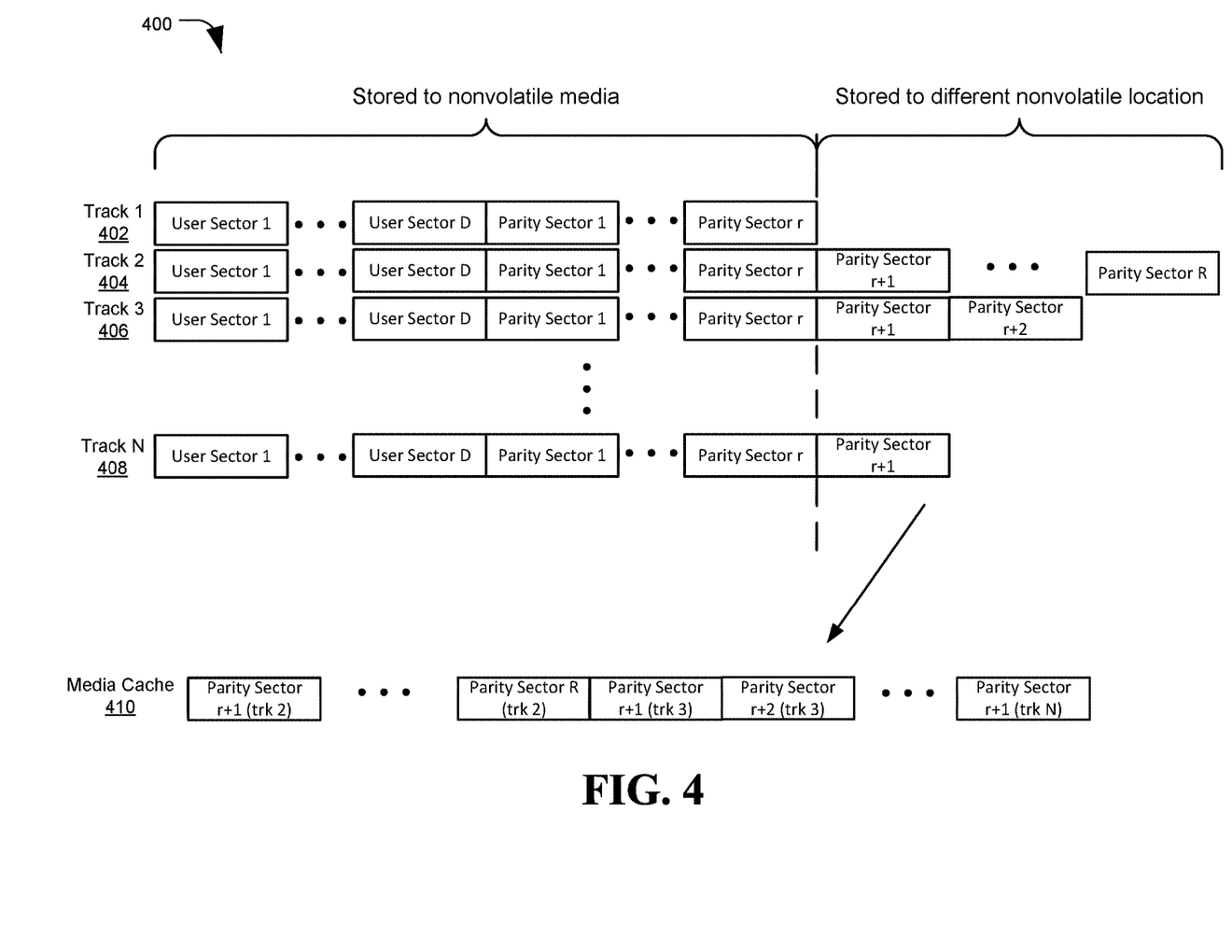
FIG. 4 is a diagram of a system configured to employ variable parity sectors, in accordance with certain embodiments of the present disclosure.

Based on the error metrics, the ECCM may determine whether to retain any of the R−r parity sectors in DRAM, and if so, how many. For each track, a decision can be made on how many from the R−r parity sectors need to be preserved. This number can be 0, 1, 2 . . . or R−r. If less than the full R−r parity sectors are retained, any extra parity sectors can be discarded to free up space in DRAM. The retained additional parity sectors may then be written to nonvolatile media, such as in a media cache zone or some other spare zone. In some embodiments, the additional parity sectors may be written to the same region (e.g. the same track) as the rest of the OC block. Additional parity sectors may be transferred to media after some number of track writes, when the DSD is idle, or at other intervals. FIG. 4 depicts an example embodiment of a system after the number of additional parity sectors has been selected for each of tracks 1 to N.

FIG. 4 is a diagram of a system, generally designated 400, configured to employ variable parity sectors, in accordance with certain embodiments of the present disclosure. As in FIG. 3, system 400 includes a set of data tracks, including track 1 402, track 2 404, track 3 406, up to track N 408. The ECCM may have generated R parity sectors for each track. The user data sectors and r parity sectors may be stored to the nonvolatile media, and the remaining R−r parity sectors may be stored to DRAM. Using error metrics for each track, the ECCM may determine a number of the remaining R−r parity sectors to retain for each of the tracks. In the depicted embodiment, the ECCM determined that the data written to track 1 402 is high quality with a low likelihood of errors, and accordingly does not retain any additional parity sectors for track 1 402. Therefore only r parity sectors are retained for the track 1 402 OC block, and the remaining R−r parity sectors for track 1 may be discarded from DRAM. The ECCM may determine that track 2 404 is very likely to have read errors, and accordingly determines to retain all of the additional parity sectors, from r+1 through R. Similarly, the ECCM determines to retain two additional parity sectors for track 3 406, and one additional parity sector for track N 408. All additional parity sectors not selected to be retained may be discarded to free up space in DRAM. During an idle time, the ECCM may transfer the retained additional parity sectors from DRAM to a nonvolatile media region, such as a media cache 410, a spare zone, or some other non-volatile region of the system. The ECCM may update a mapping or address table to associate the additional parity sectors with the corresponding OC block, so that the parity sectors may be located during error correction operations.

The ECCM may determine error metrics and a number of additional parity sectors to retain after each track or other OC block is written. In other embodiments, the ECCM may make error metric and additional parity block determinations after some selected number of track writes "X". For example, X can be the number of tracks in a band for Shingled Magnetic Recording (SMR) drives, or X can be some selected number, say 100, for conventional magnetic recording (CMR) drives. Waiting until X tracks have been written may increase the likelihood of obtaining reliable error metrics (e.g. due to later-written tracks creating a possibility of errors in earlier-written tracks). Error metrics such as position error signal (PES) data can be stored temporarily for each of the X tracks until a parity sector determination is made. A method of performing a data write operation using variable parity sectors is described in regard to FIG. 5.

Figure 5:
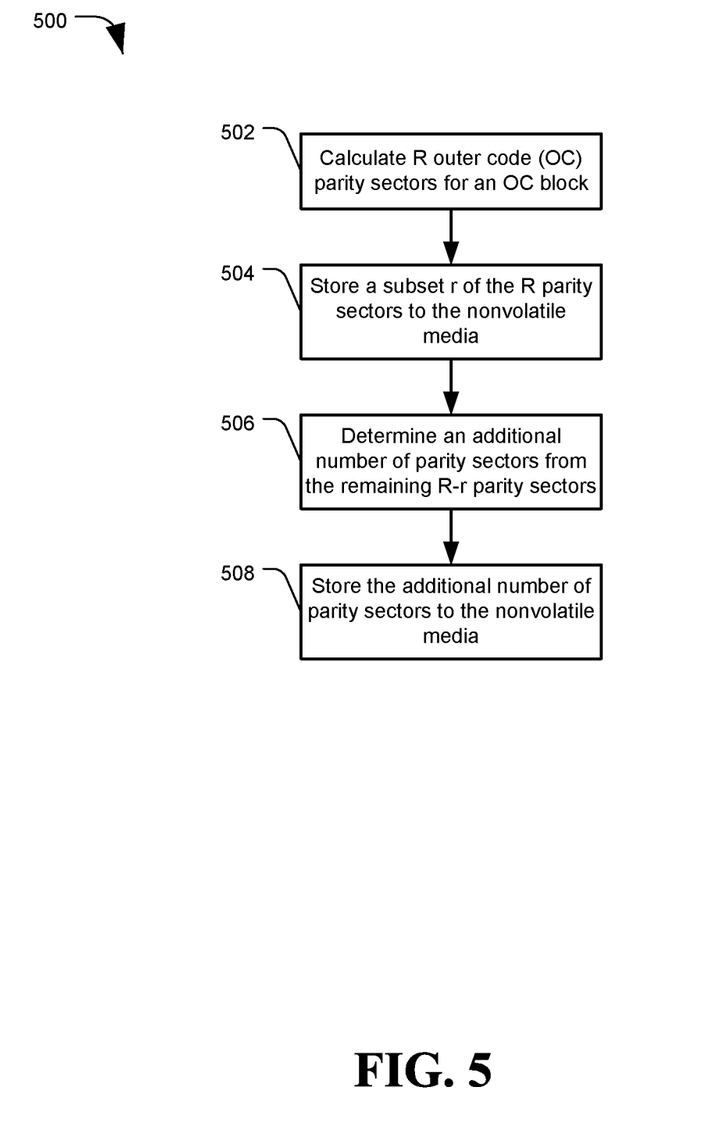
FIG. 5 is a flowchart of a method for employing variable parity sectors, in accordance with certain embodiments of the present disclosure.

FIG. 5 is a flowchart of a method, generally designated 500, for employing variable parity sectors, in accordance with certain embodiments of the present disclosure. The method 500 may be performed by an ECCM as described herein, or by one or more other components of a data storage device.

Method 500 may include calculating a selected number "R" of outer code parity sectors for an outer code (OC) block, at 502. As described herein, an outer code block may be a selected number of user data sectors that are grouped together for outer code encoding, and may, for example, comprise a track's worth of user data sectors (less any space of the track reserved for parity sectors, servo sectors, or the like). Once enough user data has been accumulated in a write buffer to fill an OC block, the system may perform outer code encoding on the sectors and generate the R parity sectors.

A subset of the R parity sectors, being a selected number "r" less than R, may be written with the user data sectors to the nonvolatile media, at 504. The user data and the r written parity sectors may be discarded from temporary data storage. The remaining R−r parity sectors may be stored to DRAM or another temporary storage location.

The method 500 may include determining an additional number of parity sectors to retain from the remaining R−r leftover parity sectors, at 506. The number of additional parity sectors to retain may be based on an expected likelihood that more than the r parity sectors may be need to read or recover the stored user data of the OC block. This expected likelihood may be based on error metrics for the stored data, which error metrics may be obtained from the servo or channel, based on performing a read of the OC block, or in other ways. Error metrics indicating the stored data is difficult to read may result in selecting a high number of additional parity sectors (e.g. the full R−r remaining parity sectors), while data that is easily read may result in selecting a low number of additional parity sectors (e.g. 0 or 1). At 508, the method 500 may include storing the determined additional number of parity sectors to the nonvolatile media, such as in a media cache zone or an area reserved for parity sectors.

While the method 500 and other examples herein discuss generating R parity sectors for a full OC block of user data, and determining an additional number of parity sectors to retain for the OC block, this disclosure is not limited thereto. The process of generating a first number R of parity sectors, and selecting a number of parity sectors to retain from that R parity sectors can be performed for any relevant data storage operation. For example, a data storage device may receive a random write request that is less than an OC block, or to update less than all sectors in an OC block. When this occurs, the DSD may generate intermediate parity sectors (sometimes called intermediate super parity sectors, ISPs) for only the data in the random write. The ISPs may be used for error recovery on the data from the random write, and may only be stored temporarily until new parity sectors can be generated for a full OC block including the random write data. The DSD may be configured to generate R intermediate parity sectors for random write data, and then determine how many of the R intermediate parity sectors to retain until full OC block parity sectors can be generated. The number of ISPs to retain may be based on error metrics for the random write data. The number R of ISPs to generate may be fixed for all random writes, or it may be based on an amount of random write data. For example, one ISP may be generated per twenty sectors of random write user data, with potentially fewer ISPs retained based on the error metrics for the written data.

Figure 6:
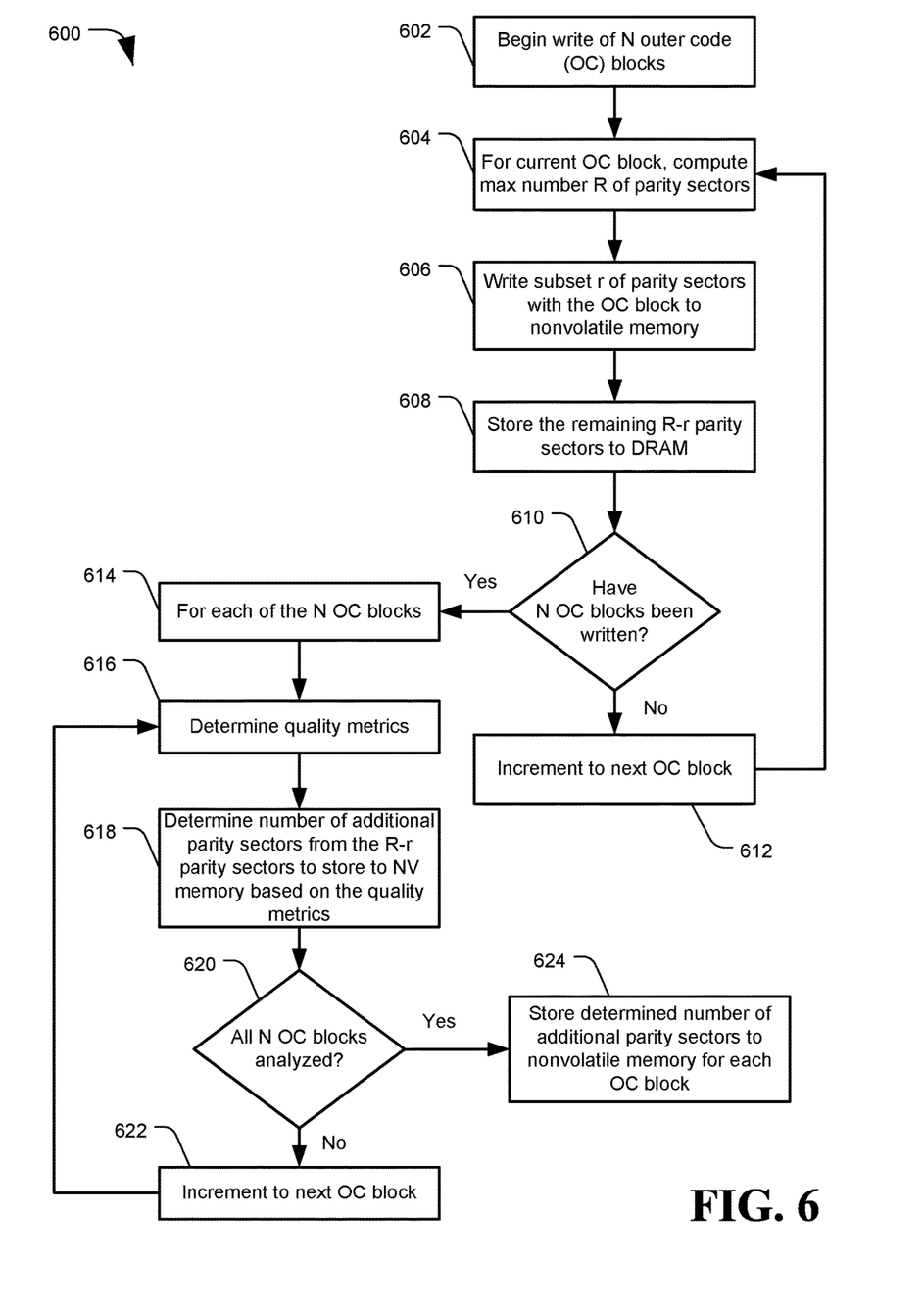
FIG. 6 is a flowchart of a method for employing variable parity sectors, in accordance with certain embodiments of the present disclosure.

Turning now to FIG. 6, a flowchart of a method 600 for employing variable parity sectors is shown, in accordance with certain embodiments of the present disclosure. The method 600 of FIG. 6 may be a more detailed method for performing data writes and selecting a number of parity sectors to retain than shown in FIG. 5. The method 600 may be performed by an ECCM or one or more other components of a data storage system.

The method 600 may include beginning a write of a selected number "N" of outer code (OC) blocks, at 602. For example, an OC block may include a track of user data, and N may be the number of tracks in a shingled recording band. In another example, an OC block may include a word-line or a selected number of pages of a NAND flash memory block, and N may be the number of word-lines or pages in a block. In another example, an OC block may be half a track of a disc memory, and N may be 1, so that the method 600 is performed with every OC block write.

The method 600 may include, for the current OC block, computing a maximum number R of parity sectors, at 604. At 606, the method 600 may including writing a subset r of the R parity sectors (with r<R) to a nonvolatile data storage medium with the user data of the OC block. The numbers R and r may be set by a manufacturer, set by a user, based on an amount of user data in the OC block, or based on other factors.

The method 600 may include storing the remaining R−r parity sectors (e.g. all of the R generated parity sectors not including the r sectors written with the OC block) to a temporary memory location such as DRAM, at 608. A determination may then be made whether N OC blocks have been written, at 610. If not, the method 600 may include incrementing to the next OC block, at 612, and computing R parity sectors for the next OC block at 604. Incrementing to the next OC block at 612 may including waiting to receive additional write data, e.g. from a host device, until enough data for an OC block has been received.

If a determination is made that N OC blocks have been written, at 610, then for each of the N OC blocks (614), the following operations may be performed. At 616, the method 600 may include determining quality metrics or error metrics for the current OC block, as described herein. Based on the quality metrics, the method 600 may include determining a number of additional parity sectors from the R−r remaining parity sectors to store to nonvolatile memory, at 618. A determination may then be made of whether all N of the OC blocks have been analyzed, at 620. If not, the method 600 may include incrementing to the next OC block from the N OC blocks, at 622, and determining the quality metrics for that OC block, at 616. Once all N of the OC blocks have been analyzed, at 620, the method 600 may include storing the determined number of additional parity sectors for each OC block to nonvolatile memory. The method may include updating an addressing or mapping table to associate the additional parity sectors with their respective OC blocks. A method of using the stored variable parity sectors for error recovery is addressed in regard to FIG. 7.

Figure 7:
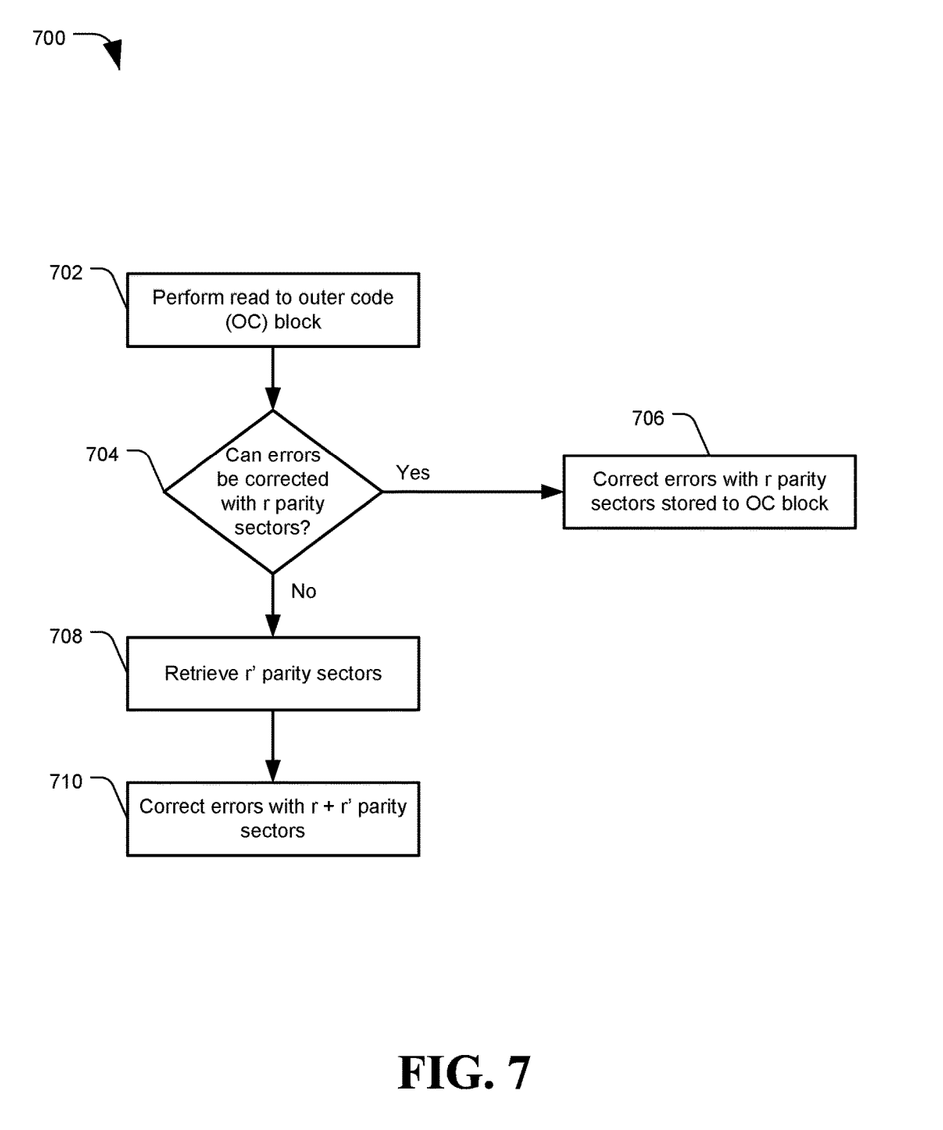
FIG. 7 is a flowchart of a method for employing variable parity sectors, in accordance with certain embodiments of the present disclosure.

FIG. 7 is a flowchart of a method 700 for employing variable parity sectors, in accordance with certain embodiments of the present disclosure. The method 700 may be performed by an ECCM as described herein, or by one or more other components of a data storage device.

The method 700 may include performing a read to an outer code (OC) block, at 702. For example, the read may be performed in response to receiving a read request from a host device. During the read operation, read errors may be encountered, such as being unable to decode one or more sectors with inner code error correction alone. A determination may be made whether any errors encountered can be corrected with the "r" parity sectors stored with the OC block, at 704. As discussed herein, a number r of parity sectors may be stored with an OC block, regardless of quality or error metrics for the OC block. For example, if the OC block is a data track and r equals 4, there may be 4 parity sectors stored at the end of the data track. In an example, each parity sector may be used to recover one sector that failed to read. Accordingly, if three sectors failed to read during the read operation, a determination may be made that the errors can be corrected with the r parity sectors, since the three errors is less than the four parity sectors. If the errors can be corrected with the r parity sectors, at 704, the method 700 may include correcting the errors with the r parity sectors stored to the OC block, at 706, and completing the read operation.

If the r parity sectors are not enough to correct the errors, at 704, the method may include retrieving the r' parity sectors from their storage location. The r' parity sectors may refer to the number of additional parity sectors that were retained for the OC block, with r'<=the R−r remaining additional parity sectors from the total calculated R sectors after the r sectors were written with the OC block. For example, if R=10 parity sectors were generated for the OC block, and r=4 parity sectors were written with the OC block, then there were R−r=10−4=6 remaining additional parity sectors. Based on quality or error metrics, the system may have decided to retain r'=3 of those 6 additional parity sectors and store them to a media cache zone of a nonvolatile memory.

Once the r' parity sectors have been read, the method 700 may include correcting the read errors with the r+r' parity sectors. For example, if r=4 and r'=3, then the system may be able to correct 4+3=7 total failed sector reads using OC erasure recovery (and possibly more with IOC recovery). The failed sectors may be derived from the successfully read user sectors and the r+r' parity sectors. The read and derived data may be used to complete the read operation (e.g. by returning the requested data to the host). A more detailed example of a read operation using variable parity sectors is described in regard to FIG. 8.

Figure 8:
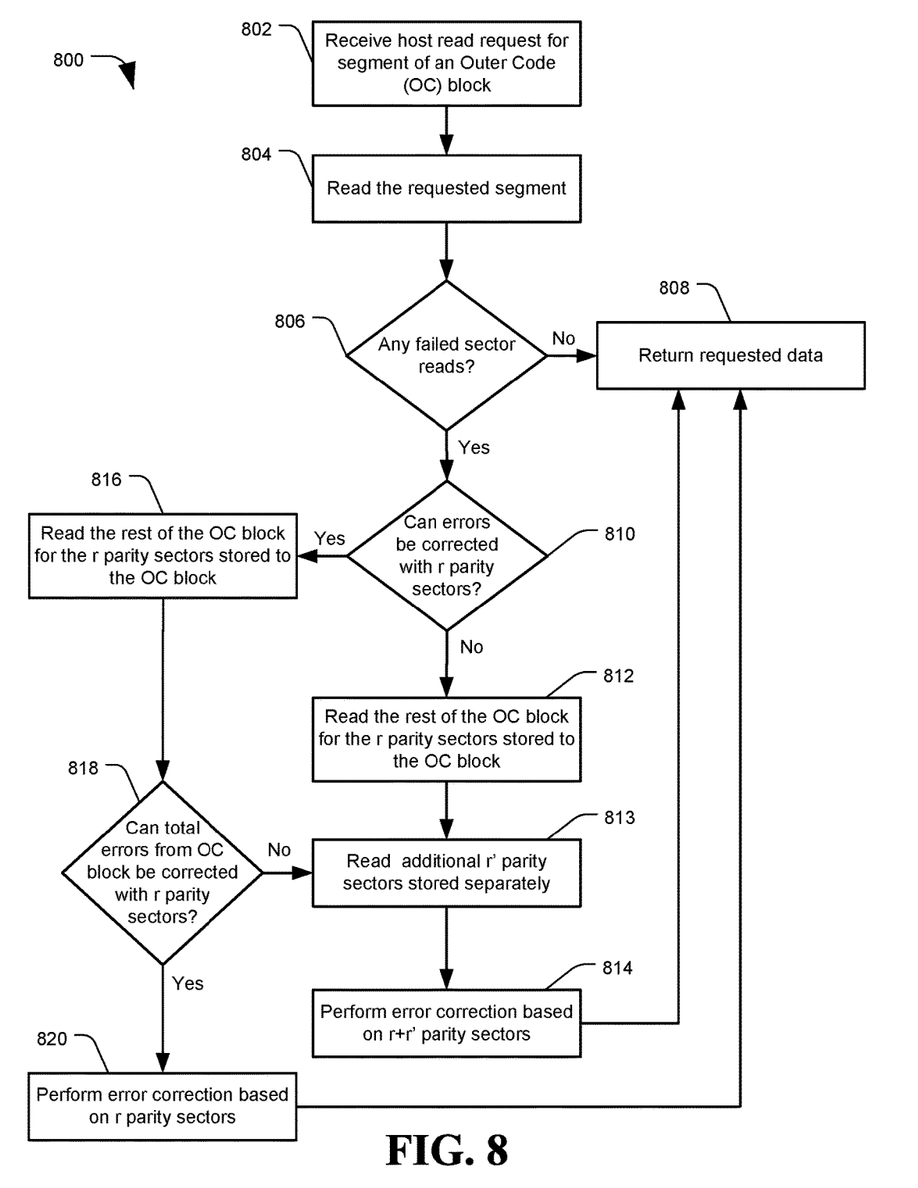
FIG. 8 is a flowchart of a method for employing variable parity sectors, in accordance with certain embodiments of the present disclosure.

FIG. 8 is a flowchart of a method 800 for employing variable parity sectors, in accordance with certain embodiments of the present disclosure. The method 800 may be performed by an ECCM as described herein, or by one or more other components of a data storage device.

Method 800 may include receiving a host read request for a segment of an OC block, at 802, and reading the requested segment, at 804. The segment may be less than the full OC block, and may normally result in a DSD reading only the requested sectors rather than the full OC block.

A determination may be made whether any requested sectors failed to read during the read operation, at 806. A sector may be considered to have failed to read if inner code error correction and other decoding operations requiring reading less than the full OC block failed. If no sectors failed, the method 800 may include returning the requested data, at 808. However, failed sectors may result in a system performing a full read of the OC block including the r parity sectors stored with the OC block. If some sectors did fail to read, a determination may be made whether the number of failed sector reads can be corrected with the r parity sectors stored with the OC block, at 810. In some examples, the number of sectors that can be recovered with r parity sectors may be equal to r for OC error recovery, and may be some threshold number greater than r for iterative outer code (IOC) error recovery.

If the number of failed sector reads cannot be corrected with r parity sectors, the method 800 may include reading the rest of the OC block including the r parity sectors stored to the OC block, at 812, as well as reading the additional r' parity sectors stored elsewhere, at 813. The r' parity sectors may be the additional parity sectors stored for the OC block as discussed herein. The method 800 may include performing error correction based on the r+r' parity sectors, at 814, and returning the requested data, at 808.

If the number of failed sector reads can be corrected with r parity sectors, at 810, the method 800 may include reading the rest of the OC block for the r parity sectors stored to the OC block, at 816. Reading the full OC block may result in additional failed sector reads. For example, if the original read was for twenty sectors from a hundred-sector OC block, resulting in three read errors, reading the remaining 80 sectors of the OC block may have resulted in two additional read errors, for five total read errors for the OC block. Accordingly, a determination may then be made whether the total number of failed sector reads from the OC block is still low enough to correct with r parity sectors, at 818. If not, the method 800 may include reading the addition r' parity sectors at 813, and performing error correction based on the r+r' parity sectors, at 814. If the total number of failed sector reads for the OC block can be corrected with r parity sectors, at 818, the method may include performing error correction based on the r parity sectors, and returning the requested data, at 808.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a processor configured to:
   generate a first number of parity sectors for write data prior to storing the write data to a nonvolatile memory;
   store the write data and a second number of parity sectors to the nonvolatile memory, the second number of parity sectors being a subset less than all of the first number of parity sectors;
   select additional parity sectors from the first number of parity sectors based on error metrics for the write data;
   store the additional parity sectors to the nonvolatile memory; and
   perform error recovery on the write data based on the additional parity sectors.

2. The apparatus of claim 1 comprising the processor further configured to:
   store the write data and the second number of parity sectors to a first region of the nonvolatile memory; and
   store the additional parity sectors to a second region of the nonvolatile memory different from the first region.

3. The apparatus of claim 2 further comprising:
   the nonvolatile memory includes a disc data storage medium;
   the first region is a first track of the disc data storage medium; and
   the second region includes a second track of the disc data storage medium.

4. The apparatus of claim 3 further comprising:
   the first track is part of a shingled recording band of multiple tracks written such that each track of the shingled recording band partially overlaps a preceding adjacent track; and
   the second track is in a media cache area of the disc data storage medium written in a non-shingled format.

5. The apparatus of claim 1, further comprising:
   the first number of parity sectors includes the second number of parity sectors and remaining parity sectors exclusive of the second number of parity sectors; and
   the processor further configured to select the additional parity sectors from remaining parity sectors.

6. The apparatus of claim 5 comprising the processor further configured to:
   maintain the remaining parity sectors in a volatile memory after storing the write data and the second number of parity sectors to the nonvolatile memory; and
   do not maintain the write data and the second number of parity sectors in the volatile memory after storing the write data and the second number of parity sectors to the nonvolatile memory.

7. The apparatus of claim 1 comprising the processor further configured to:
   determine a number of anticipated errors in the write data stored to the nonvolatile memory based on the error metrics; and
   determine how many additional parity sectors to select based on the number of anticipated errors.

8. The apparatus of claim 1 further comprising the error metrics include a number of failed sectors encountered during a read of the write data from the nonvolatile memory.

9. The apparatus of claim 1 further comprising the error metrics include position error values obtained while storing the write data to the nonvolatile memory.

10. The apparatus of claim 1 comprising the processor further configured to:
    store the write data and the second number of parity sectors to the nonvolatile memory as an error correction code (ECC) block;

store a selected number of ECC blocks to the nonvolatile memory prior to selecting the additional parity sectors for the ECC blocks; and after storing the selected number of ECC blocks, evaluate error metrics for each ECC block of the selected number of ECC blocks to determine a number of additional parity sectors for each ECC block; and store the determined number of additional parity sectors for each ECC block to the nonvolatile memory.

11. The apparatus of claim 1 comprising the processor further configured to:

perform a read operation to the nonvolatile memory for the write data;

determine whether a number of errors encountered during the read operation can be corrected with the second number of parity sectors;

when the number of errors encountered cannot be corrected with the second number of parity sectors, perform error recovery on the write data based on the additional parity sectors, including:

read the second number of parity sectors and the additional parity sectors from the nonvolatile memory; and correct errors encountered during the read operation using the second number of parity sectors and the additional parity sectors.

12. A method comprising:

generating a first number of parity sectors in a volatile memory for write data to be written to a nonvolatile memory when the write data is received;

storing the write data and a second number of parity sectors to the nonvolatile memory, the second number of parity sectors being a subset less than all of the first number of parity sectors;

not maintaining the write data and the second number of parity sectors in the volatile memory after storing the write data and the second number of parity sectors to the nonvolatile memory;

maintaining remaining parity sectors, including the first number of parity sectors not including the second number of parity sectors, in the volatile memory;

selecting additional parity sectors from the remaining parity sectors based on error metrics for the write data;

storing the additional parity sectors to the nonvolatile memory; and performing error recovery on the write data based on the additional parity sectors.

13. The method of claim 12 further comprising:

the nonvolatile memory includes a disc data storage medium;

storing the write data and the second number of parity sectors to a shingled recording band of multiple tracks written so that each track of the shingled recording band partially overlaps a preceding adjacent track; and storing the additional parity sectors to a non-shingled area of the disc.

14. The method of claim 12 further comprising:

determining a number of anticipated errors in the write data stored to the nonvolatile memory based on the error metrics; and determining how many additional parity sectors to select based on the number of anticipated errors.

15. The method of claim 12 further comprising:

storing the write data and the second number of parity sectors to the nonvolatile memory as an error correction code (ECC) block;

storing a selected number of ECC blocks to the nonvolatile memory prior to selecting the additional parity sectors for the ECC blocks; and after storing the selected number of ECC blocks, evaluating error metrics for each ECC block of the selected number of ECC blocks to determine a number of additional parity sectors for each ECC block; and storing the determined number of additional parity sectors for each ECC block to the nonvolatile memory.

16. The method of claim 12 further comprising:

performing a read operation to the nonvolatile memory for the write data;

determining whether a number of errors encountered during the read operation can be corrected with the second number of parity sectors;

when the number of errors encountered cannot be corrected with the second number of parity sectors, performing error recovery on the write data based on the additional parity sectors, including:

reading the second number of parity sectors and the additional parity sectors from the nonvolatile memory; and correcting errors encountered during the read operation using the second number of parity sectors and the additional parity sectors.

17. The method of claim 12 further comprising:

generating the first number of parity sectors prior to storing the write data to the nonvolatile memory.

18. A memory device storing instructions that, when executed, cause a processor to perform a method comprising:

generating a first number of parity sectors for write data to be written to a nonvolatile memory;

storing the write data and a second number of parity sectors to the nonvolatile memory, the second number of parity sectors being a subset less than all of the previously generated first number of parity sectors;

selecting additional parity sectors from the first number of parity sectors based on error metrics for the write data;

storing the additional parity sectors to the nonvolatile memory; and performing error recovery on the write data based on the additional parity sectors.

19. The memory device of claim 18, the method further comprising:

determining a number of anticipated errors in the write data stored to the nonvolatile memory based on the error metrics; and determining how many additional parity sectors to select based on the number of anticipated errors.

20. The memory device of claim 18, the method further comprising:

performing a read operation to the nonvolatile memory for the write data;

determining whether a number of errors encountered during the read operation can be corrected with the second number of parity sectors;

when the number of errors encountered cannot be corrected with the second number of parity sectors, performing error recovery on the write data based on the additional parity sectors, including:

reading the second number of parity sectors and the additional parity sectors from the nonvolatile memory; and correcting errors encountered during the read operation using the second number of parity sectors and the additional parity sectors.

\* \* \* \* \*